April 18, 1939.  G. HEGWEIN  2,154,845
COMBINED WATER BOILER AND BEVERAGE INFUSER
Filed Feb. 26, 1938
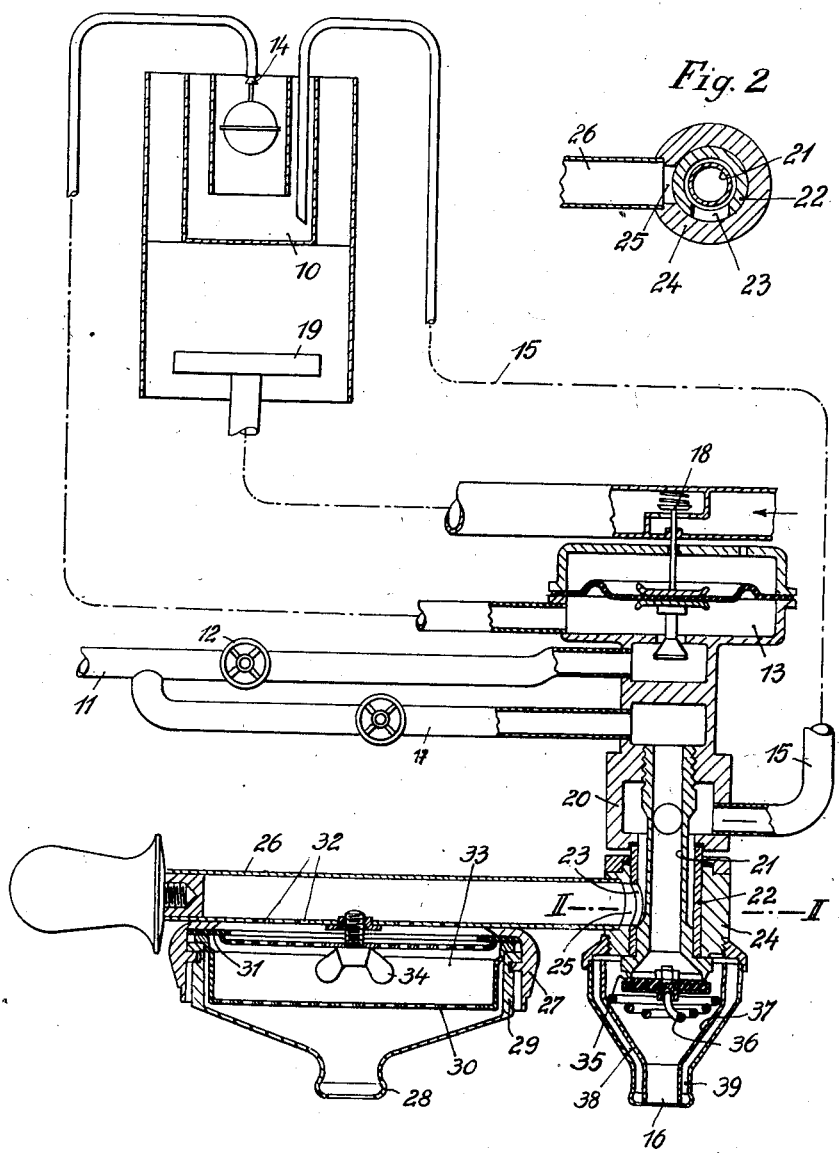
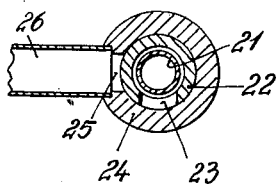
Inventor:
Georg Hegwein
by Roy F. Steward
his attorney Patented Apr. 18, 1939

2,154,845

UNITED STATES PATENT OFFICE 2,154,845

COMBINED WATER BOILER AND BEVERAGE INFUSER

Georg Hegwein, Dessau, Germany, assignor to Junkers & Co. G. m. b. H., Dessau, Germany Application February 26, 1938, Serial No. 192,859
In Germany March 1, 1937

7 Claims. (Cl. 53—3)

This invention relates to a water boiler having an infuser for making coffee, tea or other beverages combined therewith.

According to the invention the draw-off pipe connecting the boiler with the infuser is provided with a device which can be operated either to pass the water into the infuser or to pass it to another outlet as hereinafter described. In a preferred arrangement the infuser is carried by means such as a pivoting arm, the swinging of which controls the operation of the water diverting device.

This preferred arrangement has inter alia, the advantage that domestic boilers of the kind largely used in households and generally mounted over a draining board or the like can at a very slight expense by replacing the usual draw-off cock be made to serve as coffee making machines for example in addition to their other uses. According to requirements the water diverting device can be moved to one of two positions so that the water can either be drawn off direct or allowed to flow through the infuser.

In the case of liquid heaters of the type wherein on starting up the water runs cold at first and does not boil until the heater has been on for a certain time, the arrangement according to the invention has the advantage that the water can be allowed to run away freely until boiling hot and then by actuating the diverting device, for example by swinging the pivotal arm, it can be passed through the infuser. In liquid heaters in which the supply of cold water is controlled by a float valve and in which the boiling water is not discharged until forced through a syphon by the pressure of the steam generated on the attainment of boiling temperature, the arrangement according to the invention offers a further advantage. In such heaters the water diverting device is preferably so arranged that when operated it opens or shuts off the passage to the infuser whilst the other water outlet remains in continuous connection with the hot water delivery pipe and is kept closed solely by means of a spring-loaded safety or relief valve. The result thus attained is that the water in the heater is heated to over 100° C. and a certain steam pressure corresponding with the loading of the spring is generated. On the opening of the passage to the infuser the pressure on the water is at once relieved, resulting in an increased generation of steam so that a mixture of boiling water and steam is passed through the infuser. This circumstance is of great importance for obtaining a good flavour in the infused beverage. Moreover the closing of the free outlet solely by means of a spring-loaded safety or relief valve has the advantage that if, when the water is passed to the infuser it should meet with excessive resistance to flow for example as the result of obstruction in the infuser the heater cannot become suddenly subjected to undue pressure since the water will then flow, through the spring-loaded valve, to the other outlet.

To enable the invention to be fully understood it will now be described with reference to the accompanying drawing in which:

Fig. 1 represents a typical partly diagrammatic embodiment of one form of the invention and Fig. 2 is a section on the line II—II of Fig. 1.

As shown, 10 denotes the water tank of the heater, the fresh water from the cold water pipe 11 being admitted through a pressure regulator 13 and float valve 14 when the cold water cock 12 is turned on. The boiling water is delivered to the outlet nozzle 16 through a syphon 15 dipping into the tank 10. A cold water pipe 17 branching from the supply pipe 11 also leads to the water outlet. The pressure regulator 13 also serves for automatically opening the gas valve 18 controlling the supply of gas to the burner 19. The water outlet comprises a casing 20 into which the hot water pipe 15 opens, a hollow shaft 21 screwed into the top of the casing and projecting below same, a fixed sleeve 22 with a slide-valve port 23 and a rotatable valve 24 adapted to turn on the sleeve 22 and having a lateral opening 25 and serving as a spigot. The valve is held in position by a collar on the hollow shaft 21 as shown. Secured in the lateral opening 25 of the rotary valve 24 is a tube 26 serving as pivotal arm and provided with a handle 25a. The tube 26 carries the infuser, comprising a cover 27 mounted on the tube 26, and a casing 29 (forming the outlet 28) detachably mounted by means of screw threads, bayonet catch or the like and fitted with a strainer 30. The strainer 30, for holding ground coffee, tea or the like is suspended loosely in the casing 29 and in screwing home the casing 29 is pressed tightly against a packing ring 31 clamped in the cover 27. The interior of the tube 26 communicates with the infuser through openings 32. A second strainer 33 is secured to the cover 27 of the infuser by a wing nut 34. The lower outlet of the hollow shaft 21 is closed by a safety or relief valve 35 loaded by a spring 36. The spring 36 also serves for securing in the nozzle 16 an interior sleeve 37 in such relation to the outer casing 38 of the nozzle that an annular space 39 is provided between them and between the inner ends of sleeve 31 and rotatable valve member 24 which is always open to the atmosphere and forms an additional outlet for the water coming from the heater, suitable spacing studs or ribs, not shown, being provided between the sleeve and nozzle to maintain the desired spacing.

The operation of this arrangement is as follows:

When the boiler is to be set in operation the infuser is turned, by means of the pivotal arm 26 into such a position that the passage 23, 25 for the water is closed by the rotary valve 24. The water can then only issue through the other outlet 16 and in so doing it must first overcome the pressure of the spring-loaded valve 35. Consequently, the pressure in the tank 10 becomes higher than in the case of a perfectly free outflow, the water thus becoming more highly heated, e. g., to about 110° C. owing to the resulting retarded ebullition. During the period of waiting until boiling water flows through the outlet 16, the infuser can be got ready for use by filling it with ground coffee or the like. The infuser is then swung round so that the rotary valve 24 opens the passage 23, 25 and allows the water to pass to the infuser. Since in so passing the water meets with less resistance than is offered by the spring-loaded valve, this valve closes at once and the boiling water is driven by the steam pressure through the infuser and indeed with considerable force on account of the temporarily increased generation of steam in the heater as the result of the pressure-relief occurring at that moment. Should the infuser oppose an excessive resistance to the water through being choked with coffee grounds for example the resulting increase of pressure will be relieved and rendered harmless by the automatic opening of the valve 35.

When the bottom member 29 of the infuser is detached the infuser can be used as a rinsing spray, the strainer 33 being secured to the cover 27 for that purpose.

Having now particularly described and ascertained the nature of our said invention and in what manner the same is to be performed, I declare that what I claim is:

1. The combination, with a water boiler, of an infuser for making a beverage, means provided with an outlet to atmosphere for discharging water from said boiler to atmosphere, valve means operable to permit flow of water from said discharge means to said infuser, and a spring loaded safety or relief valve in said discharge means and normally closing the atmospheric outlet thereof, said safety or relief valve being opened by the pressure of the water only when the infuser is shut off or interposes excessive resistance to flow of water therethrough.

2. The combination as set out in claim 1 in which the supply of water to said boiler is controlled by a float valve and in which the water discharging means includes a syphon whereby water is not discharged from said boiler until forced through said syphon by the pressure generated in said boiler.

3. The combination as set out in claim 1 in which the water discharging means includes a discharge pipe and the infuser is connected to said pipe by a pivoted hollow arm carrying said infuser and by means of which water is delivered to said infuser, said arm also acting as means for actuating said valve means.

4. The combination as set out in claim 1 in which the water discharging means includes a discharge pipe and the infuser is connected to said pipe by a pivoted tube, provided with a handle, for delivering water from said pipe to said infuser, said valve means comprising a cock which is actuated by swinging movement of said tube.

5. The combination as set out in claim 1 in which the water discharging means includes a hollow casing, a hollow shaft detachably connected thereto and providing said outlet to atmosphere, said valve means including a rotatable valve member supported for rotation on said hollow shaft, said rotatable valve member being connected to said infuser by a tube which supports said infuser and delivers water thereto.

6. The combination as set out in claim 1 in which the water discharging means includes a hollow casing, a hollow shaft detachably connected thereto and providing said outlet to atmosphere, a fixed sleeve opening into said casing and surrounding said hollow shaft, said hollow sleeve being provided with a discharge port, a sleeve rotatably mounted on said fixed sleeve and provided with a port adapted to cooperate with the port in said fixed sleeve to constitute said valve means, said rotatable sleeve being provided with a hollow tube supporting said infuser, and delivering water thereto, said tube also acting as means for actuating said rotatable sleeve.

7. The combination as set out in claim 1 in which the outlet to atmosphere includes a nozzle provided with an internal sleeve spaced therefrom to permit water to flow through said internal sleeve and between said sleeve and nozzle, said spring loaded valve including a spring for holding said inner sleeve in position.

GEORG HEGWEIN.